US006433817B1

(12) United States Patent
Guerra

(10) Patent No.: US 6,433,817 B1
(45) Date of Patent: Aug. 13, 2002

(54) APPARATUS AND METHOD FOR DETERMINING THE WINNER OF A RACE

(76) Inventor: Gavin Guerra, 4-74 48th Ave., Long Island City, NY (US) 11109

( * ) Notice: Subject to any disclaimer, the term of this patent is extended or adjusted under 35 U.S.C. 154(b) by 0 days.

(21) Appl. No.: 09/517,097

(22) Filed: Mar. 2, 2000

(51) Int. Cl.[7] .................................................. H04N 7/18
(52) U.S. Cl. ..................................................... 348/157
(58) Field of Search .............................. 348/157; 368/3, 368/9–10; 346/107.1, 107.2, 80; 352/39; 345/501, 530

(56) References Cited

U.S. PATENT DOCUMENTS

| | | | | |
|---|---|---|---|---|
| 3,502,009 A | * | 3/1970 | Connors | 396/315 |
| 3,678,189 A | * | 7/1972 | Oswald | 348/157 |
| 4,133,009 A | * | 1/1979 | Kittler et al. | 360/9 |
| 4,523,204 A | * | 6/1985 | Bovay | 396/315 |
| 4,797,751 A | * | 1/1989 | Yamaguchi | 386/117 |
| 4,875,105 A | * | 10/1989 | Ohashi | 386/21 |
| 5,103,433 A | * | 4/1992 | Imhof | 368/9 |
| 5,136,283 A | * | 8/1992 | Nobs | 345/196 |

* cited by examiner

Primary Examiner—Vu Le
(74) Attorney, Agent, or Firm—Levine & Mandelbaum

(57) ABSTRACT

The winner of a race is determined by pointing the viewing axis of a camera having separate charge coupled devices sensitive to visible electromagnetic radiation and invisible electromagnetic radiation in a direction transverse to a vertical plane intersecting the finish line. A beam-splitter directs visible light to the visible CCDs for forming a visible image and invisible light to the invisible light CCD for providing range information. Superimposed images of contestants as they cross the finish line provide a real time display of their body portions "breaking through" a display background to make the winner readily apparent.

12 Claims, 2 Drawing Sheets

APPARATUS AND METHOD FOR DETERMINING THE WINNER OF A RACE

BACKGROUND OF THE INVENTION

This invention relates to races wherein two or more contestants travel over a course to a finish line and the contestant who crosses the finish line first wins the race. More specifically, the invention is directed to a method of, and the construction of apparatus for, providing an unambiguous view of the crossing of the finish line of a race course by the winner.

Various ways of determining the winner of a race are known in the art. U.S. Pat. No. 3,829,869, issued to Balko et al. in 1974, is of historical interest to the extent that it describes a high-speed mechanical camera which records the crossing of a finish line on film. The image is displayed as viewed along a direction within the plane of the finish line. U.S. Pat. No. 4,274,076 to Hermanns et al. provides for the contestants in a race to wear transmitters which emit a signal that is sensed by receivers at the finish line of a race course. U.S. Pat. No. 4,523,204 to Bovay teaches the use of film or magnetic media to record both the start and finish of a race in a single image, e.g., by having a first flash fired at the starting bell and another flash fired as the finish line is crossed.

U.S. Pat. No. 5,793,900 to Nourbakhsh et al. tells how to employ three cameras focused at different distances from objects in a common scene to create a three dimensional "depth map" of the scene. Proposed uses include motion detection and automobile speed measurement. U.S. Pat. No. 3,883,684 to Ikegami et al. discloses a real-time system for periodically photographing a moving object and printing the corresponding images on a medium which is moved so that the images are displaced on the medium as a function of the velocity of the object. U.S. Pat. No. 5,889,878 to Togashi improves upon a method of detecting the position of a moving object wherein a fixed reference line and the moving object are isolated from the background on which they are photographed and the position of the moving object can then be determined by repeatedly calculating its distance from the reference line.

None of the above proposed solutions provides an observer with a view of the contestants in a race which enables him or her to simply and unambiguously see a head-on unobstructed view of the winner of a race crossing the finish line, even when other contestants finish very close to the winner.

SUMMARY OF THE INVENTION

The aforementioned problems of the prior art are overcome by the instant invention which provides for giving viewers of a sports event, e.g., a race, the ability to see who won at the moment the winner crosses the finish line. A camera defines a plane by assigning a depth to the finish line and recording it as an "alpha" or "Z depth" channel. Any object moving from beyond that depth and to a position forward of it will appear to be breaking through the plane.

Video cameras are known which can provide an image of what is within the angle of view of the camera lens only at a fixed distance from the camera. That is, everything closer to, or farther from the plane of focus is eliminated from the view. Several such pictures at closely spaced distances from the camera can be superimposed to provide a view of a three dimensional object without any background. The invention involves the adaptation of this type of camera to the aforesaid application, i.e., viewing a racer in the plane of the finish line of a race course as he crosses the line. A clock may be provided to add to the display a reading of the instant time at which the finish line is crossed.

On a video monitor, a viewer sees nothing but a blank screen until something or someone emerges through the finish line plane. With a camera scanning the finish line at typical speeds of up to 1000 frames per second, one can see a figure emerging through the plane and determine without doubt who is the actual winner of the race.

It is therefore an object of the invention to provide a viewer of a race with an unambiguous real time image of the winner of the race as he or she crosses the finish line.

Another object of the invention is to provide a head-on view of the winner breaking through a vertical plane intersecting the finish line.

Still another object of the invention is to provide a head-on view of only the portions of the body of the winner which have passed the finish line.

A further object of the invention is to provide head-on views of the portions of the body of the winner which have passed the finish line in rapid sequence thereby enabling the crossing of the finish line to be seen in real time animation.

Still a further object of the invention is to provide accurate head-on views of the portions of the body of the winner which have passed the finish line irrespective of the distances of the body portions from the camera's viewing axis.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
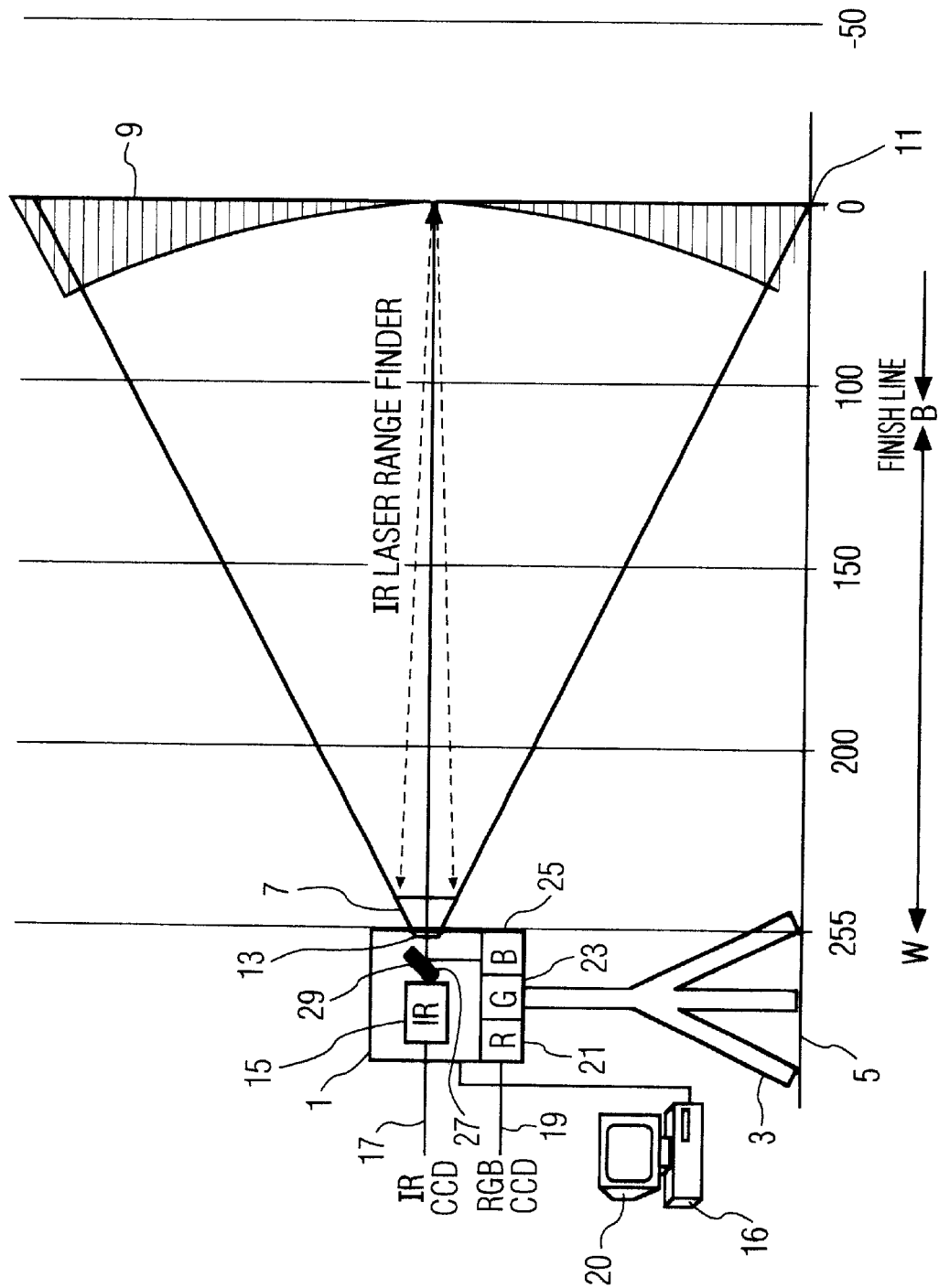
FIG. 1 is a schematic-graphical view of a preferred embodiment of the invention in a race course environment.

Referring now to FIG. 1 of the drawings, there is shown a camera 1 mounted on a tripod 3 which is preferably standing on the ground 5 in alignment with the centerline of a race course. The camera 1 has a lens 7 with an axis approximately three feet above the ground 5. Alternatively, the camera may be mounted off-axis with respect to the race course as may be necessary if it will interfere with the contestants. In the latter case, data recorded by the camera may applied to an error table for correction by application of geometrically derived factors.

The lens 7 is directed at, and prefocused on the center of, an imaginary vertical plane 9 which intersects the ground 5 at the finish line 11 of the race course. Within the camera 1 there is mounted a laser 13 which emits invisible electromagnetic radiation. In the preferred embodiment of the invention the laser 13 is an infra-red (IR) laser which emits pulses of coherent light having a specific wave length in the range of 750 to 1,500 nanometers. The pulsed IR laser output is directed through the lens 7 toward the plane of focus 9.

Also within the camera 1, there are an invisible light sensor 15, which in the preferred embodiment of the invention is an infra-red light detector, having an infra-red charge coupled device (IR CCD) circuit 17, and a visible light sensor 19 having a visible red light charged coupled display 21, a visible blue light charged coupled display 23, and a visible green light charged coupled display 25. A beam-splitter mirror 27 is mounted in the camera 1. The beam-splitter mirror 27 reflects visible light incident on its surface while allowing invisible infra-red light to pass through it. The mirror 27 is mounted at a fixed angle relative to the infra-red light sensor 15 and the visible light sensor 19 so that visible light reflected off of the contestants and through the lens 7 as they are racing toward, through, and past the finish line 11 of the race course is reflected toward the surfaces of the red, blue and green CCDs 21, 23, 25 while infrared light passes through the mirror 27 to the IR CCD 17.

A filtering mirror 29 mounted intermediate the beam-splitter mirror and the IR CCD 17 reflects received IR electromagnetic energy having wavelengths which deviate from the nominal IR laser wave length by more than 20 nanometers. Hence, use of an IR laser 13 having a nominal wave length of 1,300 nanometers will result in IR light reaching the IR CCD 17 being limited to 1,280 to 1,320 nanometers in wave length. In the preferred embodiment of the invention, the filtering mirror 29 is mounted on the rear of the beam-splitter mirror 27.

In order to minimize the effect of reflections and other artifacts which can cause blooming of the display, the IR and visible light CCDs 21, 23, 25 are scanned at a frequency which is a multiple of, e.g., twice, the frequency at which the IR laser 13 is pulsed. The scanning of the CCDs 21, 23, 25 for reading the data at their output terminals, generated in response to the electromagnetic energy incident upon them, is done in phase with the pulsing of the IR laser 13.

Data representing received signals sensed by the CCDs 21, 23, 25 during scans which are not coincident with the pulsing of the laser 13 are subtracted from the data read from the CCDs 21, 23, 25 during scans which are in phase or coincident with the pulsing of the IR laser 13. Where the scanning frequency of the CCDs 21, 23, 25 is twice the IR laser 13 pulsing frequency, each data sample read between succesive IR pulses can be directly subtracted from the in-phase readings. Where the scanning frequency of the CCDs 21, 23, 25 is a an integral multiple of the IR laser pulsing frequency, greater than 2, an average of the data samples read during scans between the IR pulses is preferably calculated and subtracted from the in-phase readings.

In the preferred embodiment of the invention, each of the visible light and IR CCDs 17, 21, 23, 25 is an 8-bit device, i.e., capable of distinguishing among 256 levels of intensity of the incident electromagnetic energy to which it is sensitive (IR, red, blue, or green). In all, 32 bits of information (8 bits for each of the IR, red, blue and green channels) are read with each scan of each pixel of the CCDs 21, 23, 25. A scan of all pixels of each of the CCDs 17, 21, 23, and 25 constitutes a single data frame for forming a single image of the plane 9 and all portions of a contestants body in front of the plane 9, i.e., intermediate the plane 9 and the camera 1.

In order for the IR CCD 17 to perform the function of providing range information, the camera 1 is calibrated so that the IR CCD 17 produces numerical data at its output indicative of 256 levels of IR intensity corresponding to 256 steps or subdivisions of the distance between a point on the race course before the finish line plane 9, and the camera 1. The minimum level of intensity corresponds to the reflection of IR light emitted by the pulsed laser 13 from a contestant at the race course finish line 11. The maximum level of intensity corresponds to the reflection of IR light emitted by the pulsed laser 13 from a contestant proximate the front element of the camera lens 7. IR reflections from contestants significantly more distant from the camera 1 than the finish line 11 are below the threshold at which the IR CCD 17 begins to generate non-zero data in response to IR energy incident upon it.

A computer 16, which can be a conventional personal computer, has the usual microprocessor, random access memory, fixed disk non-volatile storage and a video driver circuit board 18 for driving a video monitor 20 have a display device, e.g. a cathode ray tube, on which the vertical plane 9 at the finish line 11 of the race course can be viewed as a neutral unilluminated, e.g., black, background 6. The display is divided into pixels which are scanned for being illuminated as a function of the data outputs of the CCDs 17, 21, 23, 25.

In the preferred embodiment of the invention, the display is updated at a rate of 100 frames per second, speeds of up to 1000 frames per second or more being possible with current technology. Each frame of data includes eight bits from each CCD for each pixel of the CRT. Each byte from a pixel output of a red, blue or green CCD 21, 23, 25 in the visible light sensor 19 represents a number between 0 and 255 which is indicative of the respective red, blue or green intensity of a corresponding pixel displayed in the CRT.

A black and white image of the contestants is derived from the infra-red sensor 15. Whether or not portions of the image are black or white is a function of the distance of the contestants from the camera. A threshold for the "alpha" or "Z depth" channel is established at the finish line by adjusting the sensitivity of the camera. Portions of the "alpha" or "Z depth" channel image representing objects or body portions more distant from the camera than the finish line are black while portions of the "alpha" or "Z depth" channel image representing objects or body portions at the finish line, or nearer to the camera than the finish line, are white.

Likewise, the red, blue and green components of a colored image of the contestants is derived from the red, blue and green CCDs 21, 23, 25 of the visible light sensor 19. The black and white infra-red derived image and colored image are superimposed by combining the data output of the IR CCD 17 with the data outputs of the red, blue and green CCDs 21, 23, 25.

In the preferred embodiment of the invention, the four channel (three color and one black and white) image of each frame is saved in the known TIFF format (Target Image File Format). Other formats may be used as will be known to those killed in the art.

The result is a dynamic image, on the CRT, of the contestants "breaking through" a wall-like black background as they cross the finish line 11 of the race course.

Figure 2:
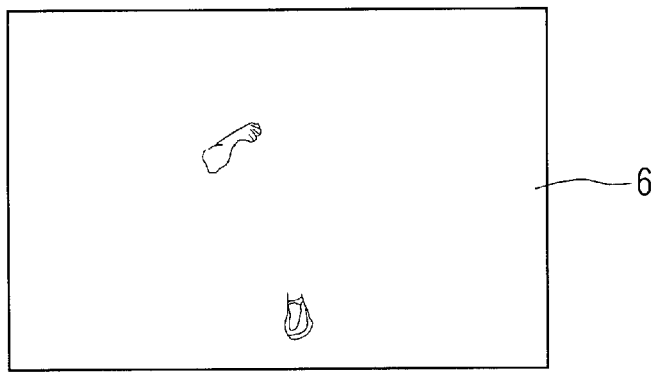
FIG. 2 is a an elevation view of a portion of the apparatus of the preferred embodiment of the invention illustrated in FIG. 1 during a first state of a race.
Figure 3:
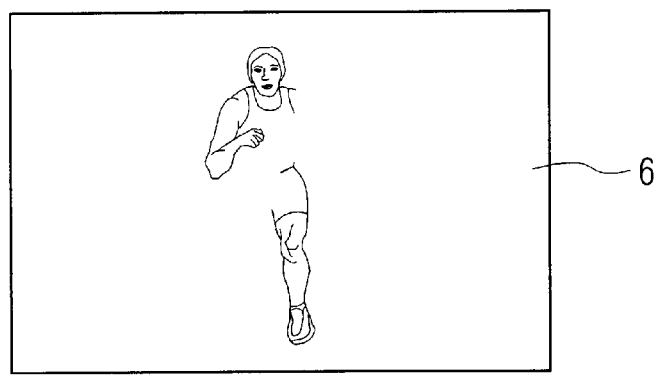
FIG. 3 is a an elevation view of the portion of the apparatus of the preferred embodiment of the invention illustrated in FIG. 2 during a second state of the race.
Figure 4:
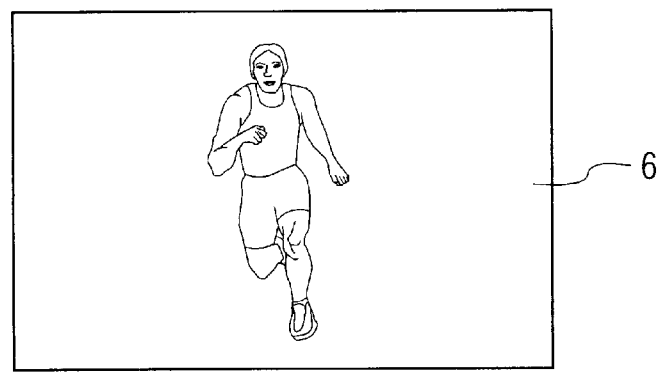
FIG. 4 is a an elevation view of the portion of the apparatus of the preferred embodiment of the invention illustrated in FIG. 2 during a third state of the race.

Referring now to FIG. 2, there is shown a frame of a CRT image of the hand, arm and foot, of a leading runner in a race, which have crossed the finish line 11. In FIG. 3, there is shown a frame recorded at a later time than when the frame of FIG. 2 was recorded. In the frame of FIG. 3, the runner's face, shoulder and leg have crossed the finish line 11 and are visible. At still a later time, a corresponding frame illustrated in FIG. 4 shows the runner's entire body in full color on the black background 6 which represents the finish line 11.

A viewer watching the frames recorded by the camera 1, in sequence, can readily see the winner of a race "breaking through" the background 6 at the moment he or she crosses the finish line 11. Other contestants who cross the finish line 11, after the winner, can readily be seen to have lagged the winner in that their body parts will be seen only after those of the winner become visible.

The frames of recorded data can be stored in a volatile or non-volatile medium in the computer for display one-at-a-time for races having close finishes among contestants.

As can be seen in FIG. 1, due to curvature of field of the lens 7, the time for return of an IR reflection from a contestant, at or past the finish line 11, can increase with angular distance from the central axis of the lens 7, thereby failing to show the head or foot of a runner on the display until some time after it has crossed the finish line 11. In order to compensate for this type of error, a lookup table of values to be added to the intensity data generated by the CCDs 17 for off-axis pixels is provided.

As the pixel data output of each CCD is scanned for each frame to be recorded, the appropriate correction for each pixel is added to the CCD intensity output corresponding to the amplitude of the electromagnetic energy incident at the corresponding pixel of the CCD.

It is to be appreciated that the foregoing is a description of a preferred embodiment of the invention to which variations and modifications may be made without departing from the spirit and scope of the invention.

What is claimed is:

1. Apparatus for determining the crossing of a finish line in a race course by one or more contestants in a race, comprising
    video display means,
    a camera operatively connected to said video display means, said camera having a viewing axis, and being adapted for mounting with said viewing axis intersecting a vertical plane which intersects said race course at said finish line, said camera further having a visible light sensor with a plurality of pixels corresponding to pixels on said video display means for receiving visible electromagnetic energy reflected by said contestants and producing, for each pixel, data indicative of an intensity of visible light to be displayed at a corresponding pixel on said video display means, and an invisible light sensor having a plurality of pixels corresponding to pixels on said video display means for receiving invisible electromagnetic energy reflected by said contestants and producing, for each pixel, data indicative of the distance of said contestants from said camera,
    means for reading said data indicative of an intensity of visible light and data indicative of the distance of said contestants from said camera,
    means for combining said data indicative of an intensity of visible light and data indicative of the distance of said contestants from said camera to produce data indicative of the intensity of a superimposed image of portions of the contestants to be displayed after crossing the finish line, and
    invisible radiation means for radiating invisible electromagnetic energy toward said finish line to be reflected from said contestants.

2. Apparatus according to claim 1 wherein said data indicative of the distance of said contestants from said camera is constant for all distances of said contestants from said camera which are greater than the distance of said finish line from said camera, and there are displayed on said video display means only images of portions of the contestants that have crossed the finish line.

3. Apparatus according to claim 1 wherein said camera further comprises a beam-splitter disposed in an optical path between said lens and said light sensors for directing invisible electromagnetic energy to said invisible light sensor and for directing visible electromagnetic energy to said visible light sensor.

4. Apparatus according to claim 3 wherein said beam-splitter comprises a mirror which is transparent to invisible electromagnetic energy but reflects visible electromagnetic energy.

5. Apparatus according to claim 1 wherein said visible light sensor comprises a red-sensitive charge coupled device, a blue-sensitive charge coupled device and a green-sensitive charge coupled device, and said invisible light sensor comprises an infra-red charge coupled device.

6. Apparatus according to claim 1 wherein said invisible radiation means is adapted to radiate pulses of invisible electromagnetic energy at a predetermined frequency and said means for reading reads said data indicative of the distance of said contestants from said camera at a frequency which is a multiple of said predetermined frequency, and further comprising means for subtracting from said data indicative of the distance of said contestants from said camera which is read coincidentally with the radiation of said pulses, data which is a function of the data indicative of the distance of said contestants from said camera which is read between radiations of said pulses.

7. Apparatus according to claim 1 further comprising memory means for storing a table of correction data indicative of differences between the data indicative of the distances of said contestants from said camera measured at pixels disposed at the viewing axis of said camera and data indicative of the distances of said contestants from said camera measured at pixels distal from the viewing axis of said camera, and
    means for combining said correction data with said data indicative of the distances of said contestants from said camera measured at pixels distal from the viewing axis of said camera for deriving corrected data, the intensity of the image of portions of the contestants distal from said viewing axis being a function of said corrected data.

8. A method of determining the crossing of a finish line in a race course by one or more contestants in a race, comprising
    pointing a camera having a visible light sensor and an invisible light sensor so that its viewing axis intersects a plane which intersects said race course at said finish line,
    radiating invisible electromagnetic energy toward said finish line for being be reflected from portions of the bodies of said contestants,
    deriving from said visible light sensor, a colored image of said contestants for display on a video monitor,
    deriving from said invisible light sensor, a black and white image of said contestants, which image is a function of the distance of said contestants from said camera,
    superimposing said color image on said black and white image, and
    displaying only portions of the bodies of said contestants which have crossed the finish line on a video monitor.

9. A method according to claim 8 further comprising displaying sequential images on said monitor which images are derived from successive frames of data produced by said visible light sensor and said invisible light sensor for head-on viewing of crossing of the finish line by one or more contestants.

10. A method according to claim 8 further comprising splitting light reflected from said contestants into visible and invisible components, directing the visible components to said visible light sensor and directing invisible components to said invisible light sensor, scanning said visible light sensor to read visible light data produced thereby, scanning said invisible light sensor to read invisible light data produced thereby, and combining said visible light data and invisible light data to produce composite data, and displaying said superimposed image as a function of said composite data.

11. A method according to claim 10 wherein said invisible light sensor is scanned to obtain invisible light data at a frequency which is a multiple of the frequency at which invisible electromagnetic energy is radiated toward said finish line, and subtracting from the invisible light data read coincidentally with radiations of said electromagnetic energy, data which is a function of the invisible light data read between radiations of said electromagnetic energy.

12. A method according to claim 8 further comprising storing a table of correction data indicative of differences between the data indicative of the distances of said contestants from said camera measured at pixels disposed at the viewing axis of said camera and data indicative of the distances of said contestants from said camera measured at pixels distal from the viewing axis of said camera, and combining said correction data with said data indicative of the distances of said contestants from said camera measured at pixels distal from the viewing axis of said camera for deriving corrected data, the intensity of the image of portions of the contestants distal from said viewing axis being a function of said corrected data.

* * * * *